(12) United States Patent
Farrell

(10) Patent No.: US 9,097,517 B2
(45) Date of Patent: Aug. 4, 2015

(54) TILT MINIMIZATION THROUGH INTENSITY CONTROL OF LIGHT SOURCE

(71) Applicant: Colin Farrell, Tucson, AZ (US)

(72) Inventor: Colin Farrell, Tucson, AZ (US)

(73) Assignee: BRUKER NANO INC., Santa Barbara, CA (US)

( * ) Notice: Subject to any disclaimer, the term of this patent is extended or adjusted under 35 U.S.C. 154(b) by 240 days.

(21) Appl. No.: 13/956,222

(22) Filed: Jul. 31, 2013

(65) Prior Publication Data

US 2013/0314718 A1    Nov. 28, 2013

Related U.S. Application Data

(62) Division of application No. 12/964,532, filed on Dec. 9, 2010, now Pat. No. 8,519,314.

(51) Int. Cl.
| | |
|---|---|
| G03B 13/36 | (2006.01) |
| G01B 11/26 | (2006.01) |
| G02B 7/38 | (2006.01) |
| G02B 21/24 | (2006.01) |

(52) U.S. Cl.
CPC ........ *G01B 11/26* (2013.01); *G02B 7/38* (2013.01); *G02B 21/244* (2013.01)

(58) Field of Classification Search
CPC .... G03B 2213/00; G03B 13/00; G03B 13/36; G01B 11/26; G02B 7/38; G02B 21/244
USPC ........ 250/201.2–201.8; 396/89; 359/822, 823
See application file for complete search history.

(56) References Cited

U.S. PATENT DOCUMENTS

2010/0027386 A1 *   2/2010   Nagatomi et al. ......... 369/44.32

* cited by examiner

*Primary Examiner* — Renee D Chavez
(74) *Attorney, Agent, or Firm* — Antonio R. Durando

(57) ABSTRACT

The power input to the light source of a microscope is varied as necessary to maintain a constant degree of detector saturation as the objective is moved toward a best-focus position. Focus is found by tracking the source's intensity necessary to maintain the detector irradiance at a constant level. The in-focus position is reached when the power input (and correspondingly the intensity of the light emitted by the source) reaches a minimum. The concept can be applied in a similar manner to minimize or eliminate tilt in a sample.

8 Claims, 3 Drawing Sheets

---

SET THE ILLUMINATION LEVEL TO PRODUCE AN INITIAL LEVEL OF PARTIAL SATURATION AT THE DETECTOR

↓

MOVE THE OBJECTIVE IN A PREDETERMINED DIRECTION

↓

COMPARE NEW LEVEL OF SATURATION WITH INITIAL LEVEL

↓

IF NEW LEVEL IS GREATER, CONTINUE TO MOVE THE OBJECTIVE IN THE SAME DIRECTION AND CHANGE THE ILLUMINATION TO MAINTAIN THE INITIAL LEVEL OF PARTIAL SATURATION UNTIL A MINIMUM LEVEL OF ILLUMINATION IS FOUND

↓

IF NEW LEVEL IS SMALLER, MOVE THE OBJECTIVE IN OPPOSITE DIRECTION AND CONTINUE WHILE CHANGING THE ILLUMINATION TO MAINTAIN THE INITIAL LEVEL OF PARTIAL SATURATION UNTIL A MINIMUM LEVEL OF ILLUMINATION IS FOUND

↓

SET THE OBJECTIVE POSITION CORRESPONDING TO THE MINIMUM ILLUMINATION AS THE IN-FOCUS POSITION

SET THE ILLUMINATION LEVEL TO PRODUCE AN INITIAL LEVEL OF PARTIAL SATURATION AT THE DETECTOR

↓

MOVE THE OBJECTIVE IN A PREDETERMINED DIRECTION

↓

COMPARE NEW LEVEL OF SATURATION WITH INITIAL LEVEL

↓

IF NEW LEVEL IS GREATER, CONTINUE TO MOVE THE OBJECTIVE IN THE SAME DIRECTION AND CHANGE THE ILLUMINATION TO MAINTAIN THE INITIAL LEVEL OF PARTIAL SATURATION UNTIL A MINIMUM LEVEL OF ILLUMINATION IS FOUND

↓

IF NEW LEVEL IS SMALLER, MOVE THE OBJECTIVE IN OPPOSITE DIRECTION AND CONTINUE WHILE CHANGING THE ILLUMINATION TO MAINTAIN THE INITIAL LEVEL OF PARTIAL SATURATION UNTIL A MINIMUM LEVEL OF ILLUMINATION IS FOUND

↓

SET THE OBJECTIVE POSITION CORRESPONDING TO THE MINIMUM ILLUMINATION AS THE IN-FOCUS POSITION

FIG. 3

TILT MINIMIZATION THROUGH INTENSITY CONTROL OF LIGHT SOURCE

RELATED APPLICATIONS

This application is a divisional application of U.S. Ser. No. 12/964,532, filed Dec. 9, 2010.

BACKGROUND OF THE INVENTION

1. Field of the Invention

This invention pertains to the general field of optical metrology. In particular, it pertains to a novel method and apparatus for assisting the manual or automated process of finding best focus for an imaging optical system.

2. Description of the Prior Art

The process of placing a sample in optimal focal position for imaging purposes, such as for interferometric measurements, is well understood and has been implemented using a variety of approaches that are typically based on finding the position corresponding to maximum irradiance at the detector. However, the depth of focus of an imaging optical system such as an interferometric objective is often greater than the depth of fringes produced by it. Therefore, the sample may be in focus and exhibit a high level of irradiance at the detector even though interference fringes are not visible. In such situation an erroneous measurement or no measurement at all may result.

Even when operating within the depth of fringes, it is still necessary to know in what direction to move the objective (or the sample) in order to position it in the best focal position. Typically that is done by trial and error with the attendant time delays required to assess the current scanner position relative to best focus.

Another recurring problem lies in the fact that, as the sample approaches the best focus position, the irradiance at the detector increases and it may be so large as to saturate the detector, thereby preventing the accurate determination of the position corresponding to maximum irradiance. Thus, unless the operator has some a-priori knowledge, the setting of the appropriate level of intensity for the light source is problematic.

The present invention is directed at an approach that provides solutions to these problems directly and in a manner suitable for automation.

BRIEF SUMMARY OF THE INVENTION

In general, the invention lies in the idea of varying the power input to the light source of a microscope as necessary to maintain a constant degree of detector saturation as the objective is moved toward a best-focus position. Such in-focus position is reached when the power input (and correspondingly the intensity of the light emitted by the source) required for such level of saturation reaches a minimum. In other words, focus is found not by tracking the irradiance produced by a light source operating at constant intensity output, but by tracking the source's intensity output necessary to maintain the detector irradiance at a constant level. As a result of this approach, the detector cannot experience total saturation during the process of finding focus, a recurring problem with prior-art procedures.

In one embodiment of the invention, the intensity is initially increased to the point necessary to cause 100% saturation and then reduced to a predetermined lower level deemed acceptable for displaying the image of the sample. The irradiance is then kept constant at that level. In another, preferred, embodiment, the invention is initially carried out by setting the intensity output at a level that produces the degree of detector saturation deemed acceptable for displaying the image. Then the source intensity is varied during the search for best focus as necessary to maintain the same degree of saturation.

As a result of the initial steps required to carry it out, the invention produces an immediate indication of the correct direction of motion toward focus, thereby affording an operator the ability to translate the objective (or the sample stage, as the case may be) directly in the right direction without the need for an evaluation based on an extensive search. In automated applications, this information may be displayed and recorded for future utilization in the measurement of like parts.

The concept of the invention is applicable as well in eliminating tilt in a sample being measured. Since tilt produces loss of energy in the direction of the optical path of a microscope, the irradiance received at the detector will be maximum when the sample is in a no-tilt position, i.e., perpendicular to the optical path. Therefore, according to the concept of the invention, the no-tilt position of the sample can be found by setting the initial intensity of the source to a level that causes a predetermined degree of detector saturation and then varying the intensity as necessary to maintain that degree of saturation as the tilt position of the sample is changed in the X-Y plane (that is, as the angle between the objective and the sample is varied with respect to both X and Y).

Various other aspects and advantages of the invention will become clear from the description that follows and from the novel features particularly recited in the appended claims. Therefore, to the accomplishment of the objectives described above, this invention consists of the features hereinafter illustrated in the drawings, fully described in the detailed description of the preferred embodiments, and particularly pointed out in the claims. However, such drawings and description disclose only some of the various ways in which the invention may be practiced.

BRIEF DESCRIPTION OF THE DRAWINGS

FIG. 3 is a flow-chart of the steps involved in carrying out the preferred embodiment of the invention.

DETAILED DESCRIPTION OF THE INVENTION

The term "image depth," as used herein, is intended to refer to the range of scanner positions within which the image of the sample is visible during a vertical scan of an interferometer. The term "depth of focus" refers to the range of scanner positions within which the sample is in focus during the vertical scan of the interferometer. The term "depth of fringes" refers to the range of scanner positions within which interferometric fringes produced by the sample are visible during the vertical scan of the interferometer.

Figure 1:
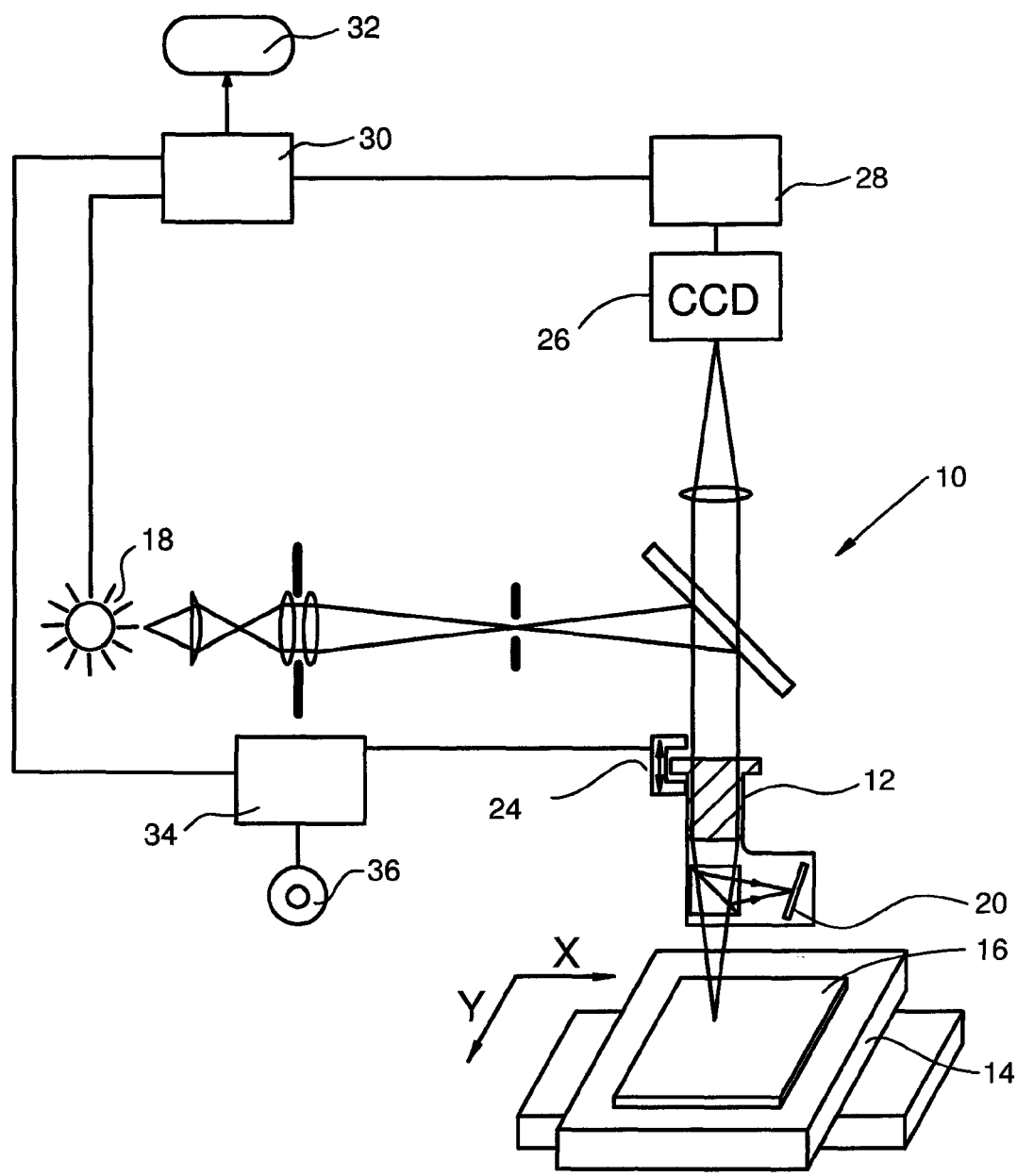
FIG. 1 is a schematic illustration of an interferometer modified for focusing and testing a sample surface according to the invention.

Referring to the figures, wherein like parts are referenced with the same numerals and symbols, FIG. 1 represents schematically a Z-scanning interferometer 10 with a microscope objective 12 and a sample stage 14 capable of relative translation in the X and Y plane (in a single direction, or in serpentine or raster fashion, as the need may be) to acquire images of multiple portions of a sample surface 16. As used herein, X and Y refer to the plane coordinates of the test surface and Z to the direction normal thereto. The interferometer comprises a light source 18 illuminating a reference mirror 20 and the sample surface 16 through the microscope objective 12. A suitable focusing mechanism 24 is provided to place the sample surface in focus and to track the height changes of the sample surface as the objective scans it so as to keep the sample in focus following any X-Y translation during the measurement. Combining the light beams generated in reflection from the mirror and the sample surface, interference fringes are produced as a result of the optical path difference between the two beams generated by the vertical scan. A detector 26 (typically a charge-coupled device "CCD" camera) and appropriate electronic components 28 are provided to acquire and transmit digitized irradiance data and for further processing by electronic apparatus, such as a computer 30 and an image display device 32.

For the purposes of the present invention the interferometer is equipped with a light source 18 capable of emitting variable and precisely controlled level of intensity. The intensity of such a light source, for example the LEDs manufactured by Philips Lumileds Lighting Company of San Jose', Calif., is varied precisely by controlling digitally the level of power input to the source. Moreover, the controller 34 is connected to the computer 30 and the focusing mechanism 24 for bringing the sample surface 16 into focus prior to the vertical scan. The controller 34 is adapted for automated operation through the computer 30 and for manual operation via a joy stick or similar device 36 in response to information displayed for a user on the monitor 32. Appropriate software is provided to enable both operations according to the invention, as detailed below.

According to the invention, the process of finding and maintaining focus for the measurement of a sample is carried out using detector saturation as the guiding parameter, rather than the customary approach of using irradiance. Instead of measuring the level of irradiance produced by a constant-intensity light source and finding focus by searching for the vertical location corresponding to maximum irradiance, the light source 18 is first energized to the degree necessary to saturate substantially all pixels of the detector 26. This is easily determined with current state-of-the-art detectors that provide pixel-by-pixel saturation information. The level of intensity emitted by the source is then decreased by reducing the power applied to it so as to produce a predetermined, preferably low, level of saturation, such as 5% of the detector pixels, for example. Then, according to one aspect of the invention, as the focusing procedure proceeds the power to the light source 18 is varied to maintain the same level of saturation of the detector, thereby ensuring that it will not become inoperable (because fully saturated) at any time during the focusing procedure.

Because the initial vertical position of the sample with respect to focus is usually not known, it is first necessary to determine the direction of motion required to find the focal plane. To that end, after the initial setting of a preferred saturation level, the objective (or the sample) is moved one step in a chosen direction and the degree of saturation is measured again. If the level of saturation increases, it means that the irradiance produced by the initial level of light-source intensity has increased and the direction is toward the focal plane. In such case, the power to the light source is decreased to maintain the initial level of saturation and another vertical step is taken in the same direction toward best focus. If, on the other hand, the level of saturation decreases after the first step, it means that the irradiance produced by the initial level of light-source intensity has decreased and the chosen direction is away from the focal plane. Accordingly, the direction of motion of the focusing mechanism 24 is reversed and the objective is moved in the opposite direction some distance from the original position without changing the original illumination, at which new point the irradiance will have increased.

Once the direction toward focus has been so determined, the objective continues to be moved step by step, preferably automatically, with the light-source intensity being adjusted at each step so as to maintain the same level of saturation of the detector. By keeping track of the light source's intensity level (or of the power input to the source, which is directly related) as a function of position, the Z location where minimum intensity was required to maintain the initial degree of saturation will generally correspond to the best focal position. Therefore, the interferometer objective is placed at that position to initiate the vertical scan required for the interferometric measurement.

Figure 2:
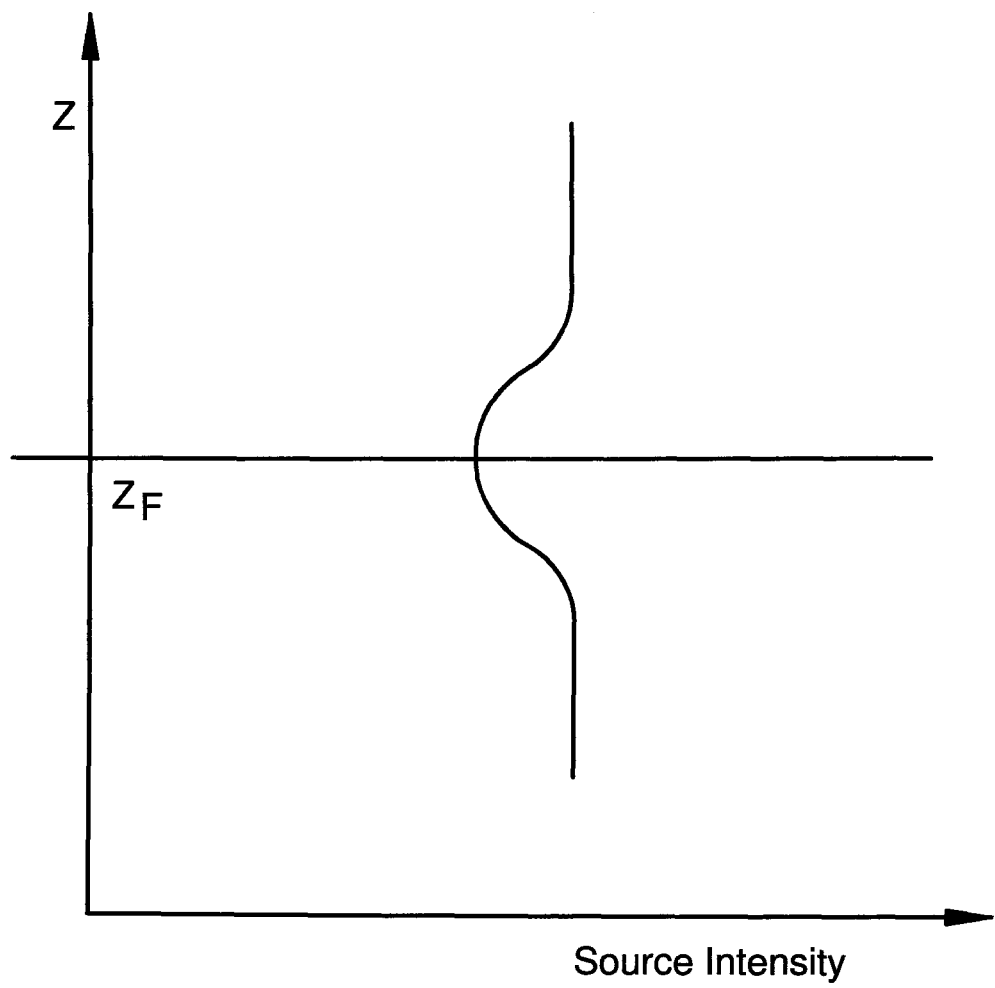
FIG. 2 illustrates the plot of light-source intensity-versus-position of the objective generated by maintaining the saturation of the detector in order to find the sample's focus position according to the invention.

FIG. 2 illustrates such an intensity-versus-position plot generated by maintaining a 5 percent detector saturation (that is, by controlling the power input to the source 18 so as to produce saturation in 5% of the detector pixels) during the vertical translation of the objective 12 over a sample mirror. The objective's position $z_F$ (i.e., its distance relative to the sample surface) corresponding to the minimum intensity required to maintain the 5% detector saturation is clearly the best in-focus position for measuring the sample. Accordingly, the instrument is set to start the interferometric measurement from the position $z_F$. In practice, that is done, either manually or automatically, as soon as the intensity level of the light source is found, within an acceptable degree of confidence, to increase from the minimum level registered at $z_F$.

According to another, simpler and preferred embodiment of the invention, the initial steps of causing detector saturation and then reducing the illumination are omitted and the light source is instead energized directly to the degree necessary to produce the desired level of detector saturation. FIG. 3 is a flow-chart of the steps involved in carrying out this preferred embodiment of the invention. Inasmuch as information about the state of saturation is available at all times from the detector, this can be achieved simply by monitoring the level of saturation as the illumination to the sample is initially gradually increased (or decreased) toward the target saturation value. Thereafter the same procedure outlined above is followed.

It is noted that the invention de facto addresses the commonly encountered initial problem of estimating the position of the focal plane relative to the current objective's position (i.e., determining whether the objective is above or below the position corresponding to its focal plane) when no a-priori knowledge is available. After the initial determination is made of the direction producing an increase in detector irradiance, the direction toward focus is established and can be used advantageously to rapidly instruct the manual operation of the focusing mechanism of the instrument. In such case, immediately after initiating the processing routine of the invention, a visual indicator (such as an arrow on a monitor) or other signal can be used to indicate to the operator the direction of manual translation toward focus.

Furthermore, the concept of the invention is applicable as well in the same manner to the process of eliminating tilt in a test sample. (As used herein, tilt is intended to refer to both tip and tilt, as these terms are commonly used in the art.) Sample tilt produces a loss of energy in the beam reflected in the direction of the optical path of a microscope; thus, the irradiance received at the detector will be maximum when the sample is in a position that is perfectly normal to the optical path (i.e., a no-tilt position). Therefore, the no-tilt position of the sample can be found by setting the initial intensity of the source to a level that causes a predetermined degree of detector saturation and then by varying the intensity as necessary to maintain that degree of saturation as the tilt position of the sample is changed in both the X and Y directions (that is, as the angle between the objective's optical path and the X-Y plane is varied along two orthogonal directions).

As in the case regarding focus, the tilt procedure is initiated by varying the angle between the objective and the sample by an initial rotational step in a predetermined angular direction. Then the new level of detector saturation produced by the initial step is compared with the predetermined level of partial saturation and the procedure is continued in that or in the opposite direction depending on whether the saturation level has increased or decreased. If the new level of detector saturation is greater than the predetermined level of partial saturation, the procedure is continued by varying the angle between the objective and the sample by continuing the rotation in the initial angular direction. If, on the other hand, the new level of detector saturation is smaller, the procedure is continued by varying the angle between the objective and the sample by rotation in the opposite angular direction. The no-tilt position is then determined by finding the sample position corresponding to the minimum irradiance registered at the sample (or light intensity emitted by the source) while maintaining the predetermined level of partial saturation of the detector.

Various changes in the details that have been described may be made by those skilled in the art within the principles and scope of the invention herein illustrated and defined in the appended claims. For example, the procedure has been described with reference to an interferometric objective, but it is clearly applicable to any imaging optical system where the sample is imaged while in focus. Similarly, the description is based on a microscope adapted to focus by translating the objective with respect to the sample; however, it is clear that the opposite (i.e., translating the sample with respect to a fixed objective), or even translating both the sample and the objective, could be done with the same results.

Thus, while the invention has been shown and described in what are believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

What is claimed is:

1. A method of minimizing tilt in a measurement sample relative to an imaging optical system, the method comprising the following steps:
   illuminating the sample with a light source producing a predetermined level of irradiance on a detector receiving an image of the sample; and
   minimizing said tilt by varying an angle between the imaging optical system and the sample and determining a no-tilt position corresponding to a minimum light intensity produced by said source while maintaining said predetermined level of irradiance on the detector;
   wherein said minimizing step is initiated by varying said angle between the imaging optical system and the sample by an initial step in a predetermined angular direction, comparing a new level of detector irradiance produced by said initial step with said predetermined level of irradiance; and
   (i) if said new level of detector irradiance is greater than said predetermined level of irradiance, continuing the finding step by varying said angle between the imaging optical system and the sample by rotation in a continuing direction equal to said predetermined angular direction; or
   (ii) if said new level of detector irradiance is smaller than said predetermined level of irradiance, continuing the finding step by varying said angle between the imaging optical system and the sample by rotation in a continuing direction opposite to said predetermined angular direction; and
   (iii) in either case (i) or (ii), continuing the rotation in said continuing direction to determine said no-tilt position corresponding to a minimum light intensity produced by said source while restoring said predetermined level of irradiance of the detector at each step.

2. The method of claim 1, further providing a user an indication of said continuing direction.

3. The method of claim 1, wherein said initial step is automated.

4. The method of claim 1, wherein said illuminating step is preceded by the steps of illuminating the sample with an irradiance sufficient to cause a substantially complete saturation of the detector and then of reducing said irradiance to said predetermined level of irradiance of the detector.

5. The method of claim 1, wherein said predetermined level of irradiance of the detector corresponds to a level of partial saturation thereof.

6. Apparatus for minimizing tilt in a sample relative to an imaging optical system, comprising:
   a variable-output illumination source;
   a detector adapted to receive an image of the sample illuminated by the source through said optical system;
   a controller adapted to vary an intensity emitted by the illumination source in response to irradiance signals received from the detector;
   a focusing mechanism adapted to vary an angle between the optical system and the sample in response to direction signals received from the controller; and
   a computer for activating the controller and the focusing mechanism in response to said irradiance and direction signals;
   wherein said computer includes programmed instructions stored therein for finding a no-tilt position corresponding to a minimum light intensity produced by said source while maintaining a predetermined level of irradiance on the detector, said instructions including varying said angle between the optical system and the sample by an initial step in a predetermined angular direction, comparing a new level of detector irradiance produced by said initial step with said predetermined level of irradiance; and
   (i) if said new level of detector irradiance is greater than said predetermined level of irradiance, continuing the finding step by varying said angle between the optical system and the sample by rotation in a continuing direction equal to said predetermined angular direction; or
   (ii) if said new level of detector irradiance is smaller than said predetermined level of irradiance, continuing the finding step by varying said angle between the optical system and the sample by rotation in a continuing direction opposite to said predetermined angular direction; and
   (iii) in either case (i) or (ii), continuing the rotation in said continuing direction to determine said no-tilt position corresponding to a minimum light intensity produced by said source while restoring said predetermined level of irradiance of the detector at each step.

7. The apparatus of claim 6, further including a display to provide a user an indication of said direction signals.

8. The method of claim 6, wherein said predetermined level of irradiance of the detector corresponds to a level of partial saturation thereof.

\* \* \* \* \*